United States Patent
Sukhija et al.

(10) Patent No.: US 8,283,173 B2
(45) Date of Patent: Oct. 9, 2012

(54) PROCESS UTILIZING NATURAL CARBON-13 ISOTOPE FOR IDENTIFICATION OF EARLY BREAKTHROUGH OF INJECTION WATER IN OIL WELLS

(75) Inventors: Balbir Singh Sukhija, Hyderabad (IN); Dontireddy Venkat Reddy, Hyderabad (IN); Pasupuleti Nagabhushanam, Hyderabad (IN); Dattatrey Jaiwant Patil, Hyderabad (IN); Syed Hussain, Hyderabad (IN)

(73) Assignee: Council of Scientific & Industrial Research, New Delhi (IN)

(*) Notice: Subject to any disclaimer, the term of this patent is extended or adjusted under 35 U.S.C. 154(b) by 247 days.

(21) Appl. No.: 12/518,406

(22) PCT Filed: Dec. 3, 2007

(86) PCT No.: PCT/IN2007/000565
§ 371 (c)(1),
(2), (4) Date: Dec. 18, 2009

(87) PCT Pub. No.: WO2008/081467
PCT Pub. Date: Jul. 10, 2008

(65) Prior Publication Data
US 2010/0089142 A1    Apr. 15, 2010

(30) Foreign Application Priority Data
Jan. 3, 2007  (IN) .............................. 31/DEL/2007

(51) Int. Cl.
*E21B 43/00*   (2006.01)
*E21B 47/00*   (2012.01)

(52) U.S. Cl. ....... 436/27; 73/152.39; 250/256; 250/259; 250/260

(58) Field of Classification Search ............... 436/27; 73/152.39; 250/256, 259, 260
See application file for complete search history.

(56) References Cited

U.S. PATENT DOCUMENTS
4,743,761 A * 5/1988 Raheim et al. ............... 250/259
2006/0249288 A1  11/2006 Drozd et al.

FOREIGN PATENT DOCUMENTS
CA  1320007 C  7/1993

OTHER PUBLICATIONS
5310 Total Organic Carbon(TOC). Standard Methods. 20: 1998.1-16.*
GEO-SEQ Best Practices Manual.(2004). pp. 1-40.*

* cited by examiner

*Primary Examiner* — Krishnan S Menon
*Assistant Examiner* — Rebecca M Fritchman
(74) *Attorney, Agent, or Firm* — Fitzpatrick, Cella, Harper & Scinto

(57) ABSTRACT

This invention relates to a process utilizing natural carbon-13 isotope for identification of early breakthrough of injection water in oil wells. All natural water sources are labeled by unique ratios of carbon isotopes ($^{13}C/_{12}C$). Following the requirements of the invention, the carbon isotope ratio for oil bearing formation water and for local aquifer water which is to be injected in to the oil reservoir rock is determined. The carbon isotope ratio of the produced water from the selected oil wells is then monitored periodically. When the carbon isotope ratio of the produced (oil well) water shows deviation from the formation water value and tends towards injection water value, then the early breakthrough phenomenon of injection water is identified. Thus the contrast in natural carbon isotope ratios of injection water, formation water and produced water from selected oil wells serve as tracer in the identification of "Early Breakthrough" phenomenon of injection water and its movement.

6 Claims, 2 Drawing Sheets

PROCESS UTILIZING NATURAL CARBON-13 ISOTOPE FOR IDENTIFICATION OF EARLY BREAKTHROUGH OF INJECTION WATER IN OIL WELLS

FIELD OF THE INVENTION

The present invention relates to a process utilizing, natural carbon-13 isotope for identification of early breakthrough of injection water and its movement in the oil wells. More particularly, the said process makes use of carbon-13 isotope naturally present in the injection water.

BACKGROUND AND PRIOR ART OF THE INVENTION

Water flooding (injection of water) is one of the methods in vogue for the secondary recovery of oil when the natural pressure of the reservoir gets diminished. The natural forces responsible for reservoir pressure are: i) expanding gas, ii) encroaching edge water (or bottom water), iii) expansion of oil plus dissolved gas, iv) gravity etc. As soon as a reservoir is struck and produced by a well disturbing its pressure equilibrium, the above forces begin to drain the oil and gas towards the well. During the lifetime of a field and in the course of production, the reservoir pressure and temperature are reduced. Eventually no more economically viable oil production is achieved. Under such situation if the oil production is to sustain, invariably pressure-building operations are to be resorted to in the field. Such operations include gas injection, water flooding or application of polymers etc. These secondary recoveries of oil operations are extremely important and useful for oil production. In addition to this, the secondary recovery of oil in general, is economical and involves less risk than exploration of a new oil field.

Out of the existing, methods, for secondary recovery of oil, water flooding is the most commonly applied and found to be more advantageous. This method promises a high percentage of oil recovery from the reservoir. Large quantities of water have to be injected at a relatively higher pressure into the injection wells.

At times, during secondary recovery of oil operations with water injection, increased water production may result from the oil wells. The increased water cut may be attributed to the Directional Fracture Permeability or Premature (Early) Breakthrough or the mobile waters within the oil field. Interference and/or hydrochemical studies may not be conclusive to prove the contention of Premature/Early Breakthrough. Despite this, the chemical and artificially produced radioactive tracers used for such studies pose handling and hazardous problems. Hence, such cases warrant development of techniques making use of environmental isotopes present in the injection water to identify the movement of injection water and establish Premature (Early) Breakthrough phenomenon in oil wells.

The method utilizing natural carbon-13 isotope present in the Injection Water for identification of early breakthrough phenomenon was carried out in one of the Oil Fields in India, where injection has been carried out by the oilfield personnel using groundwater. Since the method makes use of carbon-13 isotope present in the injection water, it avoids the handling problems associated with the addition of foreign substances into the injection water stream. Preliminary studies have indicated that the isotope contents of injected water and formation waters are different having a bearing on the depth of their occurrence. In case of environmental tracers, such as radioisotopes (tritium and radiocarbon) and stable isotopes (deuterium, oxygen-18 and carbon-13), because of their possible precision measurements using mass spectrometers even at $10^{-12}$ to $10^{-18}$ isotope ratio levels, were envisaged to be studied in the selected oil field. Preliminary isotope measurements on these samples revealed that the tritium content of the injected water was negligible (<5 T.U detection limit of our measuring system) and its further decay in the reservoir would make its detection still more formidable. The radiocarbon isotope ($^{14}C$) concentration was to be high in the groundwater as compared with the normal formation water. Similarly $\delta^{13}C$ concentration of the injection water showed contrast with respect to the formation/reservoir water. Thus the development of this method took place.

The carbon-13 isotope concentration of natural waters is measured against the most abundant carbon-12 isotope, and the ratio ($^{13}C/^{12}C$) is expressed as per milli (×1000) deviation ($\delta$(delta) ‰) from the Pee Dee Belemnite Carbonate value:

$$\delta^{13}C‰ = ((^{13}C/^{12}C_{sample} - ^{13}C/^{12}C_{standard})/(^{13}C/^{12}C_{standard})) \times 1000$$

Carbon isotopic composition of dissolved carbonate species in many aquifers have proved to be a valuable tool in defining the source and the history of these species. There is not much literature on $\delta^{13}C$ values of inorganic carbon as far as oil field waters are concerned. However $\delta^{13}C$ values of $CO_2$ and carbonate cement of petroleum reservoir are commonly reported. The average $\delta^{13}C$ value of present atmospheric $CO_2$ is −7.0‰. On the other hand, the deep formation waters which have equilibrated with lime stone would have $\delta^{13}C$ in the range 0 to +3.0‰ or even much positive values can be possible because of loss of $CO_2$ from these waters. The concentration of $\delta^{13}C$ can also be complicated by several non-mineral sources such as introduction of heavy $CO_2$ by thermal solutions or relative light $CO_2$ through oxidation, dissolved oxygen or sulphate reduction of carbon bearing substances.

However, in our method development, these are obviated as we not only studied spatial but also temporal variations in $\delta^{13}C$ of producing oil well waters as a result of water injection. Hence the present method development is essentially based on the variation of $\delta^{13}C$ concentration in the injection and formation waters.

The technique of using $^{87}Sr$ isotope for injection water study (U.S. Pat. No. 4,743,761) was based on the ratio of radioactive $^{87}Sr$ to that of stable $^{86}Sr$ isotope. For comparative study the Strontium isotopic compositions have to be measured at 0.01 to 0.02% relative standard deviation. For the measurement of $^{87}Sr/^{86}Sr$ ratio, more sophisticated and costlier instrument (Thermal Ionization Mass Spectrometer; TIMS) is needed. The Sr isotope measurements entail cumbersome and time consuming sample preparation procedures, which result in very low throughput. Sr can get precipitated as salts, and storage of brines and retrieval of pristine Sr isotopic/elemental abundances could be difficult, thus require greater care in storage.

In the case of chemical compounds (U.S. Pat. No. 3,851,171), the process involves artificial addition of water-soluble substituted stilbene compound to the injection water prior to its injection, and the produced water is analyzed for stilbene compound in it. Thus the chemical tracers involve additional expenditure and handling problems.

Thus we have developed a method, to obviate above drawbacks, for identification of Early Breakthrough phenomenon of injection water and its movement in oil wells utilizing natural carbon-13 stable isotope as a tracer, and the advantage of using carbon-13 stable isotope lies in the fact that it is present in the injection water as well as in the formation water in varying proportion. Water sample handling for $\delta^{13}C$ measurement is relatively easy and requires relatively less sophisticated equipment. $\delta^{13}C$ values cover a wide range +10 to −25‰ for inorganic carbon.

OBJECTS OF THE INVENTION

The main object of the present invention is the identification of early breakthrough of injection water in oil wells utilizing natural carbon-13 isotope, which obviates the drawbacks associated with the use of hazardous and radioactive chemicals and tracers.

Another object of the present invention is to perform a comparison of the natural carbon-13 isotope content of injection water, formation water and waters of producing wells, to identify the early breakthrough phenomenon.

SUMMARY OF THE INVENTION

Accordingly, the present invention provides a process utilizing natural carbon-13 isotope for identification of early breakthrough of injection water in oil wells, the said method comprising the steps of periodic collection of water samples from different sources, followed by chemical treatment of water samples in the field itself to precipitate dissolved inorganic carbon species, then collection of precipitates and treatment with an acid, for extraction of $CO_2$, trapping the extracted $CO_2$ by coolants, measuring the $\delta^{13}C$ content from $CO_2$ by known methods and finally, comparison of spatio-temporal variation of $\delta^{13}C$ content of different samples collected to identify the wells showing early breakthrough of injection water. In an embodiment of the present invention, the water samples taken are of formation water, injection water and waters of selected oil producing wells.

In another embodiment of the present invention, chemical treatment of water samples is done preferably with barium salts.

In a further embodiment of the present invention, acidification of extracted $CO_2$ is done preferably by ortho-phosphoric acid.

In yet another embodiment of the present invention, $\delta^{13}C$ measurement on extracted $CO_2$ is done for determining the natural $\delta^{13}C$ content of water samples.

In another embodiment of the present invention, a comparison of spatio-temporal variation of $\delta^{13}C$ content in water samples is done to identify wells showing early breakthrough of injection water.

BRIEF DESCRIPTION OF THE DRAWINGS

In the drawing accompanying this specification.

DETAILED DESCRIPTION OF THE INVENTION

Figure 1:
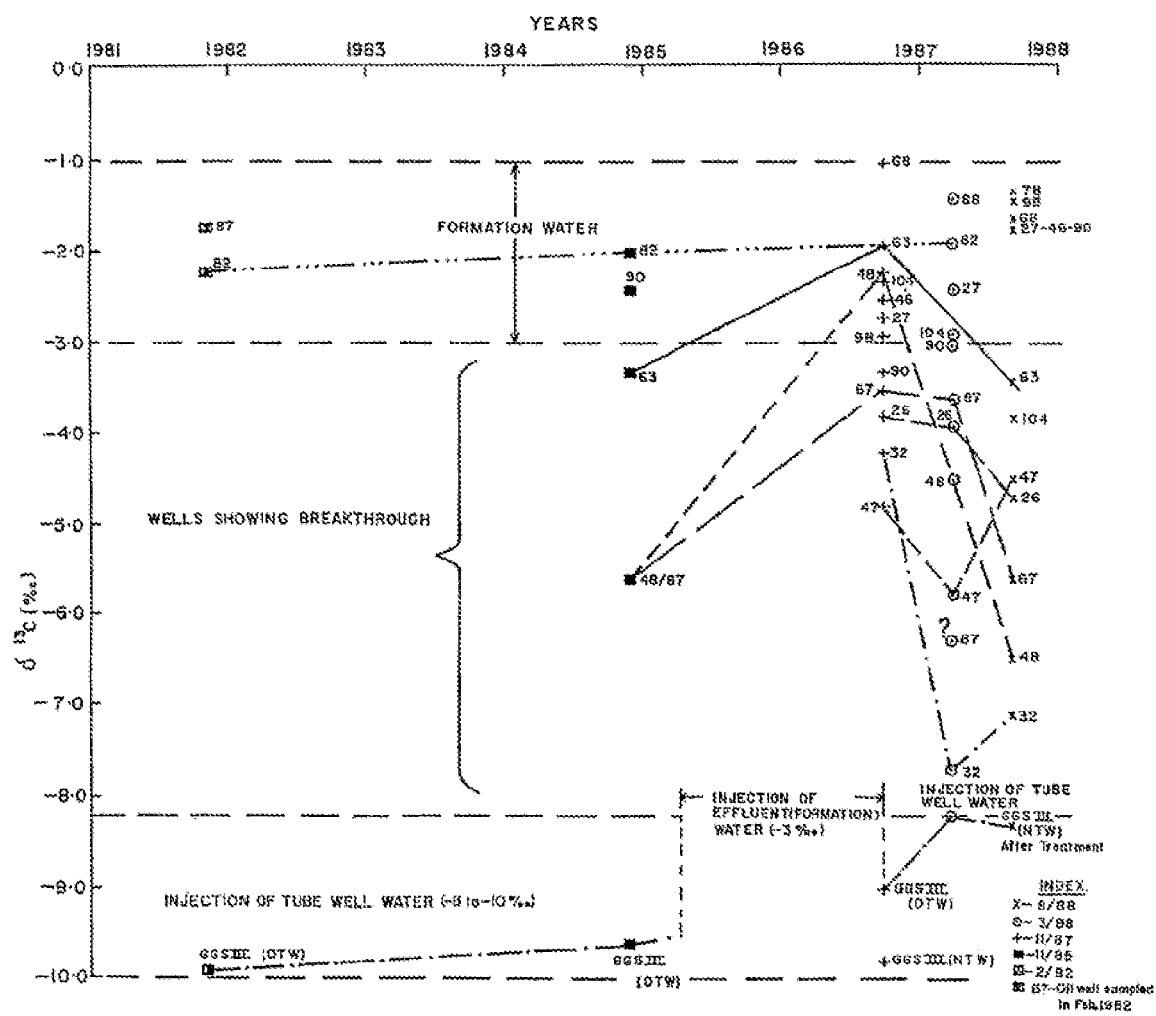
FIG. 1 represents the temporal variation of $\delta^{13}C$ content of oil field waters of selected oil producing wells in response to injection operations. Before 1987 sampling, the injection was carried out with formation water having $\delta^{13}C$ of −1.0 to −3.0‰, which was reflected by the waters of selected oil wells registering $\delta^{13}C$ lying between −1.0 and −3.0‰.
Figure 2:
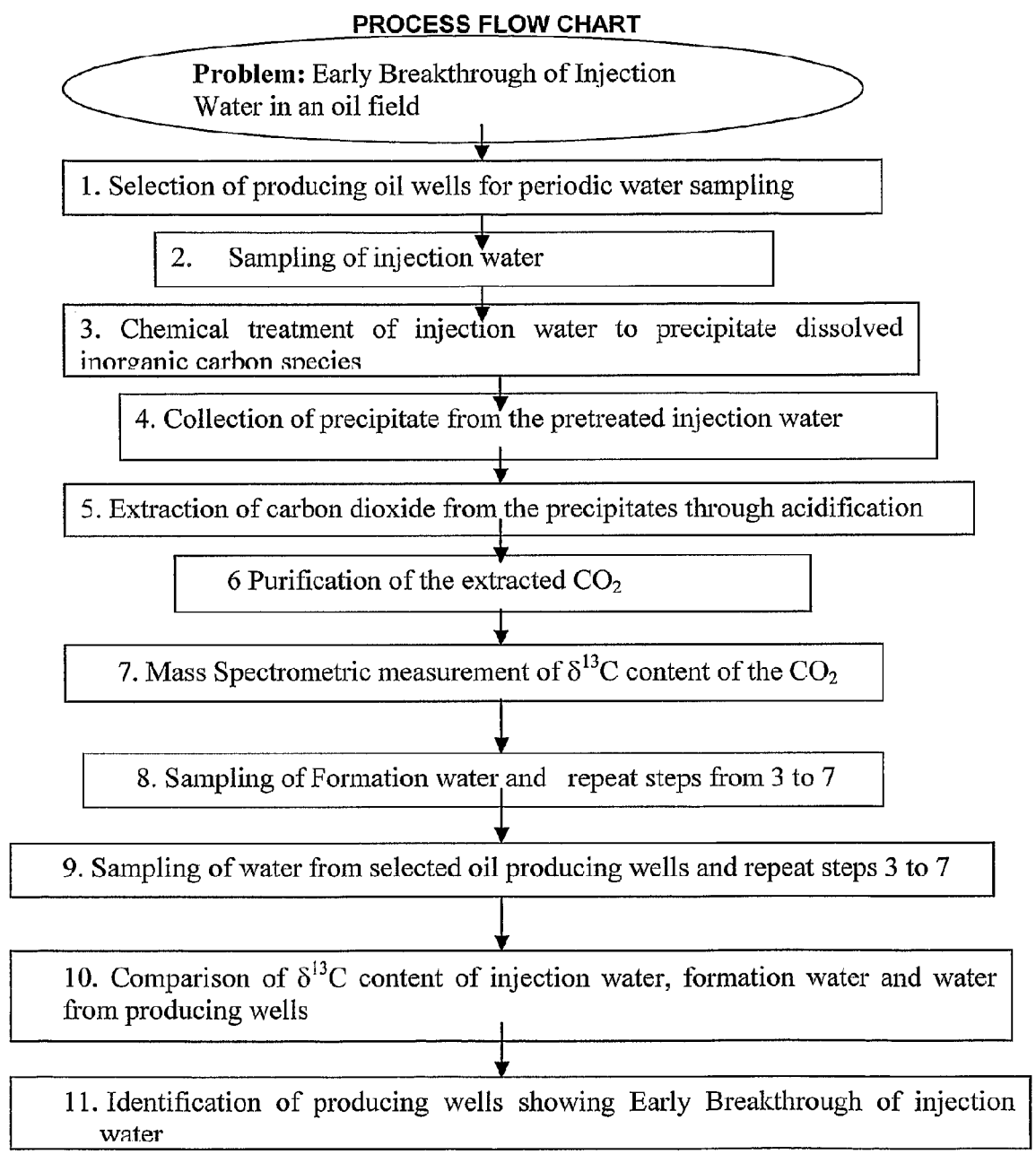
FIG. 2 represents the outline of the process in a flow chart.

The present invention provides a process utilizing natural carbon-13 isotope for identification of early breakthrough of injection water in oil wells, which comprises periodic collection of formation water, injection water and water samples from selected oil producing wells, chemical treatment of water samples in the field itself to precipitate dissolved inorganic carbon species, extraction of $CO_2$ from the precipitates by acidification, $\delta^{13}C$ measurement on extracted $CO_2$, comparison of spatio-temporal variation of $\delta^{13}C$ content and identification of wells showing early breakthrough of injection water.

Periodic collection of water samples is of formation water, injection water and water samples from selected oil producing wells. Chemical treatment of water samples is done in the field itself to precipitate dissolved inorganic carbon species. Extraction of $CO_2$ from the precipitates is done by acidification.

Then, determination and finally comparison of the $\delta^{13}C$ contents of injection water, formation water and waters of producing wells is done to identify the wells showing early breakthrough phenomenon.

Formation water is the water produced together with oil from the oil-bearing strata in oil wells. Usually underlies the oil in geological formations and is produced in increasing quantities as the oil is depleted. Injection water is the water injected into the reservoir to pressurize and displace hydrocarbons to producing wells. Injection water is also used in water-storage operations in offshore and remote locations with economic and environmental constraints. Water samples from the oil wells were collected for the measurement of $\delta^{13}C$ content of each water sample. The collected water samples were treated with chemicals such as barium chloride and barium hydroxide in the field itself to precipitate dissolved inorganic carbon species. Then the precipitates were collected, brought to laboratory and acidified with an acid such as dilute ortho-phosphoric acid for extraction of $CO_2$ using a glass vacuum system containing moisture and $CO_2$ traps cooled by coolants such as freezing mixture (salt+ice) and liquid nitrogen respectively. The extracted $CO_2$ was utilized for $\delta^{13}C$ measurement.

A total of twenty water samples were measured for spatio-temporal variation of $\delta^{13}C$ content. The $\delta^{13}C$ content of injection water was observed to remain in the range −8.0 to −10.0‰ over the study period, while the formation waters unaffected by injection water have relatively much more positive values of $\delta^{13}C$ (−2.0 to −3.0‰). The temporal variation of $\delta^{13}C$ content of the studied oil wells is shown in Table 1 and FIG. 1. From FIG. 1 it is evident that the $\delta^{13}C$ content of the high water cut oil well waters are responding to the injection water operation. While the injection water is drawn from local aquifer containing $\delta^{13}C$ in the range −8.0 to −10.0‰, the producing well water $\delta^{13}C$ content lies between that of formation water and injection water i.e., between −3.0 and −8.0‰. On the other hand discrimination of $\delta^{13}C$ between formation and production well waters was lost when the formation water itself was used for injection. However, progressively decreasing trend of $\delta^{13}C$ of production well waters in response to subsequent injection operations was an indication of early breakthrough of injection waters.

Novelty of the Invention:

The novelty of the present invention lies in the fact that the naturally present $^{13}C$ stable isotope in waters is made use of, rather than using costly and hazardous chemicals and radioactive substances in tracing the injected water. $\delta^{13}C$ measurements are relatively simple and require relatively less costly and sophisticated equipment. The ratio $\delta^{13}C$ is between two stable carbon isotopes ($^{13}C$ and $^{12}C$) present in the water itself.

Inventiveness:

The inventive steps are: collection of water samples of formation water, injection water and waters of oil producing wells, chemical treatment of water samples to precipitate dissolved inorganic carbon species, collection of precipitates from the water samples, extraction of carbon dioxide from the precipitates through acidification, purification of the extracted $CO_2$, mass Spectrometric measurement of $\delta^{13}C$ content of the $CO_2$, comparison of $\delta^{13}C$ content of injection water, formation water and water from producing wells and identification of producing wells showing Early Breakthrough of injection water.

Commercial Value:

Operations of secondary recovery of oil involving water injection are more economical over other techniques. Large quantities of water need to be injected in to the reservoir rock at high pressures to obtain economically viable oil recovery. However, at times, contrary to assessments, the secondary recovery of oil may not be economical, wherein high percent of water cut occurs because of Early Breakthrough of injection water. The invented method for identification of Early Breakthrough of injection water in oil fields has potential economic value because the method enables the oil field personnel to identify Early Breakthrough of injection water, and accordingly injection operations can be undertaken for sustained and economically viable secondary recovery of oil, or else reschedule the future strategy of injection operations thereby saving huge expenditure on injection operations.

Thus the invented method helps in assessing the economic viability of injection operations for secondary recovery of oil.

The following example is given by way of illustration and therefore should not be construed to limit the scope of the present invention.

EXAMPLE

Case I:

If normal groundwater with average $\delta^{13}C$ content of −9‰ used for the injection and further there is no mixing with formation water in the oil well, then the $\delta^{13}C$ content of water from the well showing the early break through would be −9‰.

Case II:

If formation water with average $\delta^{13}C$ content of −2‰ used for the injection and further there is either mixing or no mixing with water in the oil zone, then the $\delta^{13}C$ content of water from the well showing the early break through would be −2‰ only because injection water and water in the oil zone contains same $\delta^{13}C$ value as shown in FIG. 1.

Case III:

If normal groundwater with average $\delta^{13}C$ content of −9‰ used for the injection and further if there is mixing with formation water in the oil well containing $\delta^{13}C$ value −2‰, then the $\delta^{13}C$ content of water from the well showing the early break through would be between −2 and −9‰ as shown in the FIG. 1.

TABLE 1

Temporal variation of $\delta^{13}C$ (‰) content of selected oil well waters and injected water.

| Sl. No. | Sample code | February 1982 | November 1985 | August/September 1987 | March 1988 | August 1988 |
|---|---|---|---|---|---|---|
| 1. | N#26 | — | — | −3.8 | −3.9 | −4.7 |
| 2 | N#27 | — | — | −2.7 | −2.4 | −1.7 |
| 3. | N#32 | — | — | −4.2 | −7.7 | −7.1 |
| 4. | N#46 | — | — | −2.5 | — | −1.7 |
| 5. | N#47 | — | — | −4.8 | −5.8 | −4.5 |
| 6. | N#48 | — | −5.6 | −2.2 | −4.5 | −6.5 |
| 7. | N#57 | — | — | −0.2 | — | −6.9 |
| 8. | N#63 | — | −3.3 | −1.9 | — | −3.4 |
| 9. | N#67 | — | −5.6 | −3.5 | −3.6 | −5.6 |
| 10. | N#68 | −3.2 | −2.1 | −1.0 | −1.4 | −1.6 |
| 11. | N#78 | — | — | — | — | −1.3 |
| 12. | N#82 | −2.2 | −2.0 | — | −1.9 | — |
| 13. | N#87 | −1.7 | — | — | −6.3 | — |
| 14. | N#90 | — | −2.4 | −3.3 | −3.0 | −1.7 |
| 15. | N#98 | — | — | −2.9 | — | −1.4 |
| 16. | N#104 | — | — | −2.3 | −2.9 | −3.3 |
| 17 | GGS-II NTW (Injection water) | — | — | −7.9 | −7.1 | −6.6 |
| 18 | GGS-II OTW (Injection water) | — | — | −8.2 | −7.9 | — |
| 19. | GGS-III NTW (Injection water) | — | — | −9.8 | −8.2 | −8.3 |
| 20. | GGS-III (Injection water) | −9.9 | −9.6 | −9.0 | — | — |

Advantages of the Invention

The main advantage of the present invention is that the naturally present $^{13}C$ stable isotope in waters is made use of rather than using costly and hazardous chemicals and radioactive substances in tracing the injected water: which also involve additional expenditure on their special non-hazardous containers for transport. The ratio $\delta^{13}C$ is between two stable carbon isotopes ($^{13}C$ and $^{12}C$) naturally present in the waters is in the form of dissolved inorganic carbon species.

We claim:

1. A process utilizing natural carbon-13 isotope for identification of early breakthrough of injection water in oil wells, the process comprising the steps of:
   (a) periodic collection of water samples from different sources,
   (b) chemical treatment of the water samples, as collected in the step (a), in the field itself, to precipitate dissolved inorganic carbon species,
   (c) collection of precipitates as obtained in the step (b) and treatment with an acid, for extraction of $CO_2$,
   (d) trapping the $CO_2$ as extracted in the step (c) by coolants,
   (e) measuring the $\delta^{13}C$ content from $CO_2$ as collected in the step (d), and
   (f) comparison of spatio-temporal variation of $\delta^{13}C$ content as obtained in the step (e) of different samples collected to identify the wells showing early breakthrough of injection water.

2. A process utilizing natural carbon-13 isotope for identification of early breakthrough of injection water in oil wells according to claim 1, wherein the water samples taken are of formation water, injection water and waters of selected oil producing wells.

3. A process utilizing natural carbon-13 isotope for identification of early breakthrough of injection water in oil wells according to claim 1, wherein the chemical treatment of water samples in the step (b) is done with a barium salt.

4. A process utilizing natural carbon-13 isotope for identification of early breakthrough of injection water in oil wells according to claim 1, wherein the acid is ortho-phosphoric acid.

5. A process utilizing natural carbon-13 isotope for identification of early breakthrough of injection water in oil wells according to claim 1, wherein $\delta^{13}C$ measurement on extracted $CO_2$ is done for determining the natural $\delta^{13}C$ content of water samples.

6. A process utilizing natural carbon-13 isotope for identification of early breakthrough of injection water in oil wells according to claim 1, wherein the comparison of spatio-temporal variation of $\delta^{13}C$ content in the water samples is done to identify wells showing early breakthrough of injection water.

* * * * *